United States Patent [19]

Che et al.

[11] Patent Number: 4,851,270
[45] Date of Patent: Jul. 25, 1989

[54] INORGANIC-ORGANIC COMPOSITE COMPOSITONS EXHIBITING NONLINEAR OPTICAL RESPONSE

[75] Inventors: Tessie M. Che, Westfield; Dagobert E. Stuetz, Watchung; Alan Buckley, Berkeley Heights, all of N.J.; Donald R. Ulrich, Alexandria, Va.

[73] Assignee: Hoechst Celanese Corporation, Somerville, N.J.

[21] Appl. No.: 15,759

[22] Filed: Apr. 17, 1987

[51] Int. Cl.$^4$ .................. C09K 19/00; C09K 19/52
[52] U.S. Cl. .................................. 428/1; 252/299.01
[58] Field of Search ....................... 428/1; 252/299.01

[56] References Cited

U.S. PATENT DOCUMENTS 4,419,663 12/1983 Kohashi ........................ 350/355
4,513,034 4/1985 Sparer et al. ...................... 428/1
4,702,558 10/1987 Cules et al. .................. 252/299.01

OTHER PUBLICATIONS

Polymer Liquid Crystals, Chapt 2, H. Finkelman; Edited by C. Ferri et al., Academic Press, 1982, pp. 35–62.

*Primary Examiner*—Theodore Morris
*Attorney, Agent, or Firm*—Depaoli & O'Brien

[57] ABSTRACT

This invention provides an optical medium which consists of an inorganic glass monolith with a microporous structure containing an organic component which exhibits nonlinear optical response.

In one embodiment this invention provides a sol-gel process for producing a composite of a transparent homogeneous microporous inorganic oxide glass monolith and an organic compound which exhibits nonlinear optical response.

18 Claims, No Drawings

INORGANIC-ORGANIC COMPOSITE COMPOSITONS EXHIBITING NONLINEAR OPTICAL RESPONSE

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Of related interest with respect to the present invention are publications which describe the production of inorganic-organic composites such as J. Phys. Chem., 88, 5956 (1984) and J. Non-Cryst. Solids, 74, 395 (1985) by D. Avnir et al, and Mat. Res. Soc. Symp. Proc., 73, 809 (1986) by Pope et al; incorporated herein by reference.

There is continuing research effort to develop new nonlinear optical systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel nonlinear optical media.

It is another object of this invention to provide a transparent optical medium which is a solid composite of an inorganic oxide glass and an organic component which exhibits nonlinear optical response.

It is another object of this invention to provide a process for producing novel inorganic-organic composites.

It is a further object of this invention to provide optical devices which contain a novel nonlinear optical element.

Other objects and advantages of the present invention shall become apparent from the accompanying description and examples.

The subject matter of this patent application is related to that disclosed in copending patent application Ser. No. 15,757, filed Apr. 10, 1987, and copending patent application Ser. No. 15,758, filed Apr. 10, 1987.

DESCRIPTION OF THE INVENTION

One or more objects of the present invention are accomplished by the provision of an optical medium comprising a composite composition of an inorganic oxide glass monolith with a microporous structure containing an organic component which exhibits nonlinear optical response.

The glass monolith typically is comprised of silica either alone or in combination with up to about 20 weight percent of one or more other inorganic oxides of elements such as lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like.

A present invention glass monolith microporous structure nominally has a pore volume between about 10-80 percent of the total volume, and has pore diameters in the range between about 15-2000 angstroms. The average pore diameter typically is in the range between about 50-300 angstroms.

A glass monolith can be in the form of thin coatings on transparent or reflective substrates; films; plates; cubes; cylinders; prisms; fibers; and the like.

The nonlinear optically active organic component can occupy between about 1-99 percent of the microporous volume of the glass monolith, and usually it occupies between about 5-95 percent of the microporous volume.

The organic component can be homogeneously distributed throughout the microporous volume. In another embodiment the organic component is concentrated in a zone of the microporous structure which is adjacent to a surface of the glass monolith. As an alternative, the glass monolith can have microporosity in one or more zones, and the microporous volume of a zone contains organic component.

In another embodiment the content of the nonlinear optically active organic component has a gradient distribution in the microporous structure of an invention glass monolith.

In another embodiment this invention provides a transparent optical medium which is coated on a transparent or reflective substrate, wherein the optical medium is a composite composition comprising an inorganic oxide glass monolith with a microporous structure containing an organic component which exhibits nonlinear optical response.

In another embodiment this invention provides an optical light switch or light modulator device with an optical medium element comprising a composite composition consisting of an inorganic oxide glass monolith with a microporous structure containing an organic component which exhibits nonlinear optical response.

In another embodiment this invention provides a transparent optical medium which is in the form of a thin sheet having a thickness less than about 2 millimeters and which has each side surface coated with a transparent electrically conductive film, wherein the optical medium is a composite composition comprising an inorganic oxide glass monolith with a microporous structure containing an organic component which exhibits nonlinear optical response.

In another embodiment this invention provides a nonlinear optical medium comprising a composite composition of a homogeneous inorganic glass monolith with a microporous structure containing an organic component which comprises a compound having a molecular weight less than about 1000 and exhibiting nonlinear optical response.

The organic component can be composed of one or more additional organic constituents, e.g., a thermoplastic polymer such as polyvinyl acetate, polyacrylonitrile or poly(methyl methacrylate).

In another embodiment this invention provides a nonlinear optical meidum comprising a composite composition of a homogeneous inorganic glass monolith with a microporous structure containing an organic component which comprises a thermoplastic polymer exhibiting nonlinear optical response. The organic component can be composed of one or more additional organic constituents which exhibit nonlinear optical response.

A present invention nonlinear optical medium can have a nonlinear optically active organic component which is characterized by an external field-induced orientation of aligned molecules.

A present invention nonlinear optical medium which is noncentrosymmetric can exhibit a second order nonlinear optical susceptibility $\chi^{(2)}$ of at least about $1\times 10^{-6}$ esu as measured at 1.91 $\mu$m excitation wavelength.

A present invention nonlinear optical medium which is centrosymmetric can exhibit a third order nonlinear optical susceptibility $\chi^{(3)}$ of at least about $1\times 10^{-9}$ esu as measured at 1.91 $\mu$m excitation wavelength.

The term "external field" as employed herein refers to an electric, magnetic or mechanical stresss field which is applied to a substrate of mobile organic molecules, to induce dipolar alignment of the molecules parallel to the field.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

PREPARATION OF POROUS INORGANIC OXIDE GLASS MONOLITHS

The various methods for the manufacture of porous glass are reviewed in U.S. Pat. No. 4,528,010. The methods include the Vycor (Corning), chemical vapor deposition, white carbon, colloid silica, and silica gel procedures.

One method of producing a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for production of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; 4,588,540; and references cited therein; incorporated herein by reference.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

In another embodiment this invention provides a process for producing a composite composition comprising a homogeneous inorganic oxide glass monolith with a microporous structure containing an organic component which exhibits nonlinear optical response, which comprises hydrolyzing tetraalkoxysilane under acidic or basic pH conditions in a sol-gel reaction medium comprising water, a water-miscible organic solvent and an organic component which exhibits nonlinear optical response, until gellation of the reaction medium is completed, and removing the solvent medium to provide a porous glass monolith with incorporated organic component.

In another embodiment this invention provides a process for producing a composite composition comprising an inorganic oxide glass monolith with a microporous structure containing an organic component which exhibits nonlinear optical response, which comprises (1) hydrolyzing tetraalkoxysilane under acidic or basic pH conditions in a sol-gel reaction medium comprising water and a water-miscible organic solvent component until gellation of the reaction medium is completed; (2) removing the solvent medium to provide a porous glass monolith; and (3) impregnating the porous glass monolith with an organic component which exhibits nonlinear optical response.

The term "homogeneous" as employed herein with reference to a porous glass monolith means that the inorganic oxide composition and the microstructure are substantially invariant throughout the monolith.

Embodiments for production of porous inorganic oxide glass monoliths by the sol-gel process are described in U.S. Pat. Nos. 3,640,093; 3,678,144, 3,681,113; 3,811,918; 3,816,163; 3,827,893; 3,941,719; 4,327,065; 4,389,233; 4,397,666; 4,426,216; 4,432,956; 4,472,510; 4,477,580; 4,528,010; 4,574,063; and references cited therein; incorporated herein by reference. Mat. Res. Soc. Symp. Proc., 73, 35 (1986) by Hench et al describes the role of chemical additives in sol-gel processing; incorporated herein by reference.

Illustrative of water-miscible solvents employed in a sol-gel process embodiment are alkanols such as methanol and ethanol; ketones such as acetone and methyl ethyl ketone; esters such as methyl acetate and ethyl formate; ethers such as dioxane and tetrahydrofuran; amides such as dimethylformamide, dimethylacetamide and 1-methyl-2-pyrrolidinone; and the like.

Acidic pH conditions in the sol-gel process can be provided by the addition of mineral acids such as hydrochloric acid; and basic pH conditions can be provided by the addition of bases such as ammonium hydroxide.

Illustrative of tetraalkoxysilanes and other metal and metalloid alkoxides are methoxy and ethoxy derivatives of silicon, lithium, magnesium, titanium, manganese, aluminum, tin, antimony, and the like. Aryloxy derivatives also can be utilized in the sol-gel process.

Porous glass monoliths produced by a sol-gel process embodiment have an advantageous combination of properties, and generally have superior optical properties as compared to porous glass monoliths prepared by other techniques, e.g., by the leaching of a silica-poor phase from a borosilicate glass.

A sol-gel derived porous glass monolith is homogeneous, and the inorganic matrix can be obtained essentially free of inorganic or organic impurities, e.g., less than 2 weight percent of impurities.

A sol-gel derived porous glass monolith typically has a pore strucuture in which substantially all of the pores have diameters within about a 100 angstrom diameter variation range, e.g., within a range between about 50–150 or 300–400 or 900–1000 angstroms, as determined by sol-gel processing conditions.

A sol-gel derived porous glass monolith can have exceptional optical properties because the inorganic matrix is homogeneous in chemical composition and physical structure. Since there is minimized light scattering, the sol-gel derived porous glass monolith exhibits excellent optical transparency and light transmitting ability.

NONLINEAR OPTICALLY ACTIVE ORGANIC COMPONENT

The organic component of a present invention optical medium composite can be a small molecule or an oligomer or polymer which exhibts nonlinear optical response.

Illustrative of known nonlinear optically active compounds suitable for the preparation of the composites are 4-nitroaniline, 2-methyl-4-nitroaniline, 4-N,N-dimethylamino-4'-nitrostilbene(DANS), and the like.

In another embodiment this invention provides a nonlinear optical medium comprising a composite composition of a homogeneous inorganic oxide glass monolith with a microporous structure containing a quinodimethane compound corresponding to the formula:

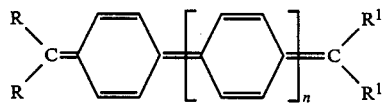

where R and $R^1$ are substituents selected from hydrogen and aliphatic, alicyclic and aromatic groups containing between about 1–20 carbon atoms; n is an integer with a value between about 1–3; and at least one of the R substituents is an electron-donating group, and at least one of the $R^1$ substituents is an electron-withdrawing group.

Illustrative of quinodimethane compounds corresponding to the above formula are 13,13-diamino-14,14-dicyanodiphenoquinodimethane; 13,13-di(dimethylamino)-14,14-dicyanodiphenoquinodimethane; 13,13-di(diethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; and the like.

In another embodiment this invention provides a nonlinear optical medium comprising a composite composition of a homogeneous inorganic oxide glass monolith with a microporous structure containing a quinodimethane compound corresponding to the formula:

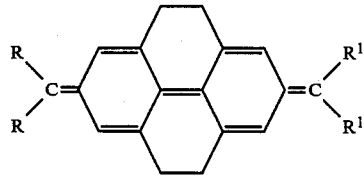

where R and $R^1$ are substituents selected from hydrogen and aliphatic, alicyclic and aromatic groups containing between about 1–20 carbon atoms; and at least one of the R substituents is an electron-donating group, and at least one of the $R^1$ substituents is an electron-withdrawing group.

Illustrative of quinodimethane compounds corresponding to the above formula are 13,13-ethylenediamino-14,14-dicyano-4,5,9,10-tetrahydropyrenoquinodimethane; 13,13-diamino-14,14-dicyano-4,5,9,10-tetrahydropyrenoquinodimethane; 13,13-di(dimethylamino)-14,14-dicyano-4,5,9,10-tetrahydropyrenoquinodimethane; 13,13-di(diethylamino)-14,14-dicyano-4,5,9,10-tetrahydropyrenoquinodimethane; 13,13-di(n-hexadecylamino)-14,14-dicyano-4,5,9,10-tetrayhydropyrenoquinodimethane; and the like.

The synthesis of quinodimethane compounds corresponding to the above illustrated formulae is described in copending patent application Ser. No. 748,583, filed June 25, 1985; incorporated herein by reference.

In another embodiment this invention provides a nonlinear optical medium comprising a composite composition of a homogeneous inorganic oxide glass monolith with a microporous structure containing a quinodimethane compound corresponding to the formula:

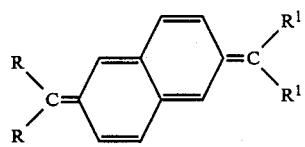

where R and $R^1$ are substituents selected from hydrogen and aliphatic, alicyclic and aromatic groups containing between about 1–20 carbon atoms, and at least one of the R substituents is an electron-donating group, and at least one of the $R^1$ substituents is an electron-withdrawing group.

Illustrative of quinodimethane compounds corresponding to the above formula are 11,11-diamino-12,12-dicyano-2,6-naphthoquinodimethane; 11,11-di(dimethylamino)-12,12-dicyano-2,6-naphthoquinodimethane; 11,11-di(n-butylamino)-12,12-dicyano-2,6-naphthoquinodimethane; 11,11-di(n-hexadecylamino)-12,12-dicyano-2,6-naphthoquinodimethane; and the like.

The synthesis of naphthoquinodimethane compounds corresponding to the above illustrated formula is described in copending patent application Ser. No.

864,203, filed May 19, 1986; incorporated herein by reference.

In another embodiment this invention provides a nonlinear optical medium comprising a composite composition of a homogeneous inorganic glass monolith with a microporous structure containing a thermoplastic polymer which is characterized by a recurring monomeric unit corresponding to the formula:

where P is a polymer main chain unit, S is a flexible spacer group having a linear chain length of between about 0-20 atoms, M is a pendant group which exhibits a second-order nonlinear optical susceptibility $\beta$ of at least about $5 \times 10^{-30}$ esu as measured at 1.91 μm excitation wavelength, and where the pendant groups comprise at least about 10 weight percent of the polymer, and the polymer has a glass transition temperature above about 40° C.

In another embodiment this invention provides a nonlinear optical medium comprising a composite composition of a homogenous inorganic glass monolith with a microporous structure containing a thermoplastic polymer which is characterized by a recurring monomeric unit corresponding to the formula:

where P is a polymer main chain unit, S is a flexible spacer group having a linear chain length of between about 0-20 atoms, M' is a pendant group which exhibits a third order nonlinear optical susceptibility $\gamma$ of at least about $1 \times 10^{-36}$ esu as measured at 1.91 μm excitation wavelength, and where the pendant groups comprise at least about 10 weight percent of the polymer, and the polymer has a glass transition temperature above about 40° C.

In another embodiment this invention provides a nonlinear optical medium comprising a composite composition of a homogeneous inorganic glass monolith with a microporous structure containing a thermoplastic polymer which is characterized by a recurring monomeric unit corresponding to the formula:

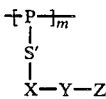

where P is a polymer main chain unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

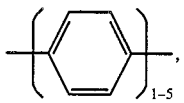

-continued

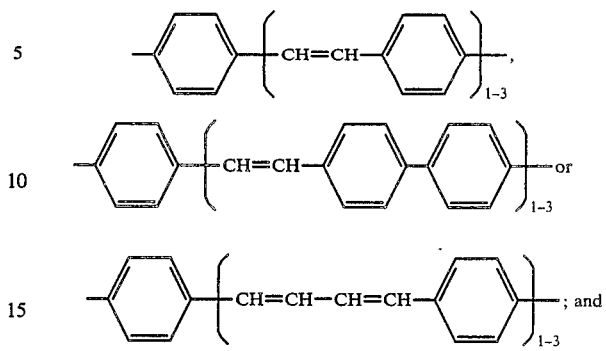

Z is an electron-donating group or an electron-withdrawing group.

The main chain of the polymer in the above-illustrated formulae can be structures such as polyvinyl, polysiloxane, polyoxyalkylene, polyamide, polyester, and the like.

In a further embodiment this invention provides a nonlinear optical medium comprising a composite composition of a homogeneous inorganic glass monolith with a microporous structure containing a thermoplastic polymer which is characterized by a recurring monomeric unit corresponding the formula:

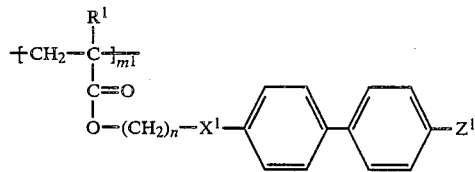

where $m^1$ is an integer of at least 5; n is an integer between about 4-20; $X^1$ is —$NR^1$, —O— or —S—; $R^1$ is hydrogen or methyl; and $Z^1$ is —$NO_2$, —CN or —$CF_3$.

The synthesis of polymers corresponding to the above formulae is described in copending patent application Ser. No. 822,090, filed Jan. 24, 1986; incorporated herein by reference.

NONLINEAR OPTICAL PROPERTIES

The fundamental concepts of nonlinear optics and their relationship to chemical structures can be expressed in terms of dipolar approximation with respect to the polarization induced in an atom or molecule by an external field.

As summarized in the ACS Symposium series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a crystalline domain:

$$\Delta\mu = \mu_e - \mu_g = \alpha E + \beta EE + \gamma EEE + \ldots \quad (1)$$

$$P = P_O = \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention nonlinear optical medium typically is optically transparent and exhibits hyperpolarization tensor properties such as third harmonic generation.

These theoretical considerations are elaborated by Garito et al in chapter 1 of the ACS Symposium Series 233 (1983); and by Lipscomb et al in J. Chem., Phys., 75, 1509 (1981), incorporated herein by reference. See also Lalama et al, Phys. Rev., A20, 1179 (1979); and Garito et al, Mol., Cryst. and Liq. Cryst., 106, 219 (1984); incorporated herein by reference.

EXTERNAL FIELD INDUCED MOLECULAR ORIENTATION

The microscopic response, or electronic susceptibility $\beta$, and its frequency dependence or dispersion, is experimentally determined by electric field-induced second harmonic generation (DCSHG) measurements of liquid solutions or gases as described in "Dispersion Of The Nonlinear Second Order Optical Susceptibility Of Organic Systems", Physical Review B, 28 (No. 12), 6766 (1983) by Garito et al, and the Molecular Crystals and Liquid Crystals publication cited above.

In the measurements, the created frequency $\omega_3$ is the second harmonic frequency designated by $2\omega$, and the fundamental frequencies $\omega_1$ and $\omega_2$ are the same frequency designated by $\omega$. An applied DC field removes the natural center of inversion symmetry of the solution, and the second harmonic signal is measured using the wedge Maker fringe method. The measured polarization at the second harmonic frequency $2\omega$ yields the effective second harmonic susceptibility of the liquid solution and thus the microscopic susceptibility $\beta$ for the molecule.

The present invention optical media preferably contain an organic component which exhibits an extremely large $\beta$ value. Illustrative of this preferred type of organic component is 13,13-diamino-14,14-dicyanodiphenoquinodimethane (DCNDQA):

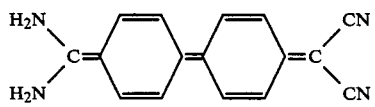

The DCNDQA molecule is characterized by a single excited state at 2.2 eV(0.6); a dipole moment difference of $\Delta\mu^x$:23$_D$; a transition moment of $\mu^x{}_{1g}$:13.6D; and large $2\omega$ and $\omega$ contributions to $\beta$ of order $10^3$ at $1\mu - 0.6\mu$, and no interfering $2\omega$ resonance from higher excitations.

A DCNDQA type of diphenoquinodimethane conjugated structure exhibits nonlinear optical responses which are 2-3 orders of magnitude greater than those of a chemical structure such as 2-methyl-4-nitroaniline.

With respect to macroscopic optical effects, if the distribution of organic molecules in a present optical medium is random, there is orientational averaging by statistical alignment of the dipolar molecules and the optical medium exhibits third order nonlinearity ($\chi^{(3)}$).

If the distribution of organic molecules in the optical medium is at least partially uniaxial in molecular orientation, then the optical medium exhibits second order nonlinearity ($\chi^{(2)}$). One method for preparing optical media with large second-order nonlinear coefficients is to remove the orientational averaging of the organic molecules with large $\gamma$ by application of an external DC electric field to the organic component in a melt phase. This can be accomplished by heating the optical medium above the melting point of the organic component, then cooling the organic melt in the presence of the external field. The poling provides the alignment predicted by the Boltzmann distribution law.

The uniaxial molecular orientation of the organic molecules in an optical medium can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

EXAMPLE I

A section of porous glass (3 cm×3 cm×3 1 mm) of 40-50 angstroms average pore diameter is submerged in a benzene solution containing 30% by weight of 2-methyl-4-nitroaniline for one hour.

The impregnated glass section is withdrawn from the solution and dried under vacuum at 60° C. to remove the benzene solvent from the pore structure. The porous glass product is transparent.

The porous glass product is film coated with poly(methyl methacrylate) by dipping the 2-methyl-4-nitroaniline impregnated porous glass into a methyl ethyl ketone solution of poly(methyl methacrylate) and then air drying.

The above procedure is repeated, except that the impregnated porous glass is coated on both sides with transparent electronically conductive indium-tin oxide.

The inorganic-organic composite optical medium exhibits third order nonlinear optical susceptibility $\chi^{(3)}$ of about $1.5 \times 10^{-9}$ esu as measured at 1.91 $\mu$m excitation wavelength.

The conductive coatings of the optical medium described above are attached to a DC power supply. The optical medium is heated above the melting point of 2-methyl-4-nitroaniline, and about $1 \times 10^5$ V/cm is applied for about 2 minutes. The optical medium is cooled to room temperature before the electric field is removed. The optical medium exhibits second order linear susceptibility $\chi^{(2)}$ of about $1 \times 10^{-6}$ esu as measured at 1.91 $\mu$m excitation wavelength.

EXAMPLE II

A starting solution for the production of thin films is prepared by admixing 50 ml of ethanol, 50 ml of dioxane, 10 ml of tetramethoxysilane, 5 ml of 0.01N HCl, 3 g of Triton® X-100[1] and 0.1 g of 13,13-di(dimethylamino)-14,14-dicyano-4,5,9,10-tetrahydropyrenoquinodimethane. The solution is allowed to stand for two hours at room temperature.

[1] Surfactant; Rohm & Haas Company.

Glass slides are dipped into the solution, and then dried at 110° C. for 10 hours. The resultant transparent film coating is a porous silicate monolith containing a pore volume encapsulated quinodimethane component.

In an alternative procedure, the quinodimethane component is not included in the film preparation solution. After glass slides are coated with porous silicate film, the glass slides are dipped into a benzene solution of quinodimethane component to impregnate the porous film coating with the solution. After glass slides are dried to remove the solvent, the resultant composite coating on the glass slides is a transparent silicate film with a microporous structure containing incorporated quinodimethane component.

The two procedures are repeated, except that the quinodimethane component is 13,13-diamino-14,14-dicyanodiphenoquinodimethane or 11,11-di(n-butylamino)-12,12-dicyano-2,6-naphthoquinodimethane.

The inorganic-organic composite optical media exhibit third-order nonlinear optical susceptibility $\chi^{(3)}$. The optical media exhibit second-order nonlinear optical susceptibility $\chi^{(2)}$ when the quinodimethane component in each optical medium has an external field-induced orientation of aligned molecules.

EXAMPLE III

A transparent porous ceramic thin film is prepared in accordance with the procedure described in U.S. Pat. No. 4,584,280.

A 50 g quantity of tetraethoxysilane is dissolved in 100 g of isopropanol, and 20 g of ethanol containing 2% of 1% aqueous hydrochloric acid solution is added dropwise with stirring. This is followed by the addition of 20 g of ethanol containing 3% hydroxyethylcellulose, and the mixture is refluxed for 15 minutes with stirring to provide a clear viscous solution.

The solution is spread on the surface of a thin stainless steel plate and dried at room temperature. The coated plate is heated in a muffle furnace at a rate of 5° C./min, and maintained at 500° C. for one hour. After gradual cooling of the plate, a transparent thin film of silicate is evident on the stainless steel surface. The average pore size is in the range of 40–60 angstroms.

The coated plate is dipped into a 20% dioxane solution of poly[6-(4-nitrobiphenyloxy)hexyl methacrylate]. The coated plate is dried at 100° C. to remove the solvent from the porous silicate film. The resultant porous silicate film has a content of incorporated nonlinear optically active polymer.

EXAMPLE IV

A.

A porous glass plate (10 cm×10 cm×1 cm) of 100–120 angstroms average pore diameter is set in a shallow pan containing a 20% toluene solution of 4-dimethylamino-4'-nitrostilbene. The one centimeter sides of the glass plate simultaneously are submerged to a depth of 3 millimeters. After 2 minutes of immersion in the solution, the glass plate is withdrawn and dried to remove the toluene solvent. The resultant porous glass plate product has a 4-dimethylamino-4'-nitrostilbene content which is concentrated in a zone of the microporous structure which is adjacent to one flat surface of the glass plate.

A similar product is obtained if the glass plate has porosity only in a narrow zone adjacent to one of the glass plate surfaces, and the pore volume is impregnated with a solution of nonlinear optically active compound, or with a melt phase of the compound.

B.

A porous glass plate (6 cm×6 cm×2 cm) of 80–100 angstroms average pore diameter is set in a shallow pan containing a 30% toluene solution of a graft polymer prepared by the reaction of polymethylhydrosiloxane (average M.W., 500–2000) with 4-(4-penteneoxy)-4'-nitrophenyl. The two centimeter sides of the glass plate simultaneously are submerged to a depth of 2 millimeters. After 20 minutes of immersion in the solution, the glass plate is withdrawn and dried to remove the toluene solvent.

The resultant porous glass plate product has a polymer content which has a gradient distribution in the microporous structure, from dense near one flat surface to less dense near the opposite flat surface. The gradient distribution is the effect of solvent capillary action in the interconnected microporous structure during the impregnation procedure.

The preparation of the nonlinear optical medium is repeated, except that the graft polymer is one prepared by the reaction of 4-N,N-dimethylamino-4'-nitrodiphenylacetylene with polymethylhydrosiloxane (1.83 hydrogen equivalents).

What is claimed is:

1. An optical medium comprising a composite composition of an inorganic oxide glass monolith with a microporous structure containing an organic component which exhibits nonlinear optical response; wherein the glass monolith microporous structure has pore diameters in the range between about 50–300 angstroms, and substantially all of the pores in the microporous structure have diameters within about 100 angstrom diameter variation range.

2. An optical medium in accordance with claim 1 wherein the inorganic oxide comprises silica.

3. An optical medium in accordance with claim 1 wherein the inorganic oxide comprises a mixture of silica and at least one additional inorganic oxide.

4. An optical medium in accordance with claim 1 wherein the optical medium exhibits a third order nonlinear optical susceptibility $\chi^{(3)}$ of at least $1 \times 10^{-9}$ esu as measured at 1.91 μm excitation wavelength.

5. An optical medium in accordance with claim 1 wherein the organic component is concentrated in a zone of the microporous structure which is adjacent to a surface of the glass monolith.

6. An optical medium in accordance with claim 1 wherein the content of the organic component has a gradient distribution in the microporous structure of the glass monolith.

7. An optical medium in accordance with claim 1 which has a thickness dimension less than about 5 millimeters.

8. An optical medium in accordance with claim 1 wherein between about 5–95 percent of the glass monolith microporous structure volume is filled with the organic component.

9. An optical medium in accordance with claim 1 wherein the organic component is characterized by an external field-induced orientation of aligned molecules.

10. An optical medium in accordance with claim 1 wherein the optical medium exhibits a second order nonlinear optical susceptibility $\chi^{(2)}$ of at least about $1 \times 10^{-6}$ esu as measured at 1.91 μm excitation wavelength.

11. A nonlinear optical medium comprising a composite composition of a homogeneous inorganic glass monolith with a microporous structure containing an organic component which comprises a thermoplastic polymer exhibiting nonlinear optical response; wherein the glass monolith microporous structure has pore diameters in the range between about 50–300 angstroms, and substantially all of the pores in the microporous structure have diameters within about a 100 angstrom diameter variation range.

12. A nonlinear optical medium in accordance with claim 11 wherein the organic component is composed of at least one additional organic constituent which exhibits nonlinear optical response.

13. A nonlinear optical medium in accordance with claim 11 wherein the organic component comprises a side chain liquid crystalline polymer.

14. A nonlinear optical medium comprising a composite composition of a homogeneous inorganic glass monolith with a microporous structure containing a thermoplastic polymer which is characterized by a recurring monomeric unit corresponding to the formula:

where P is a polymer main chain unit, S is a flexible spacer group having a linear chain length of between about 0–20 atoms, M is a pendant group which exhibits a second order nonlinear optical susceptibility β of at least about $5 \times 10^{-30}$ esu as measured at 1.91 μm excitation wavelength, and where the pendant groups comprise at least about 10 weight percent of the polymer, and the polymer has a glass transition temperature above about 40° C.; wherein the glass monolith microporous structure has pore diameters in the range between about 50–300 angstroms, and substantially all of the pores in the microporous structure have diameters within about a 100 angstrom diameter variation range.

15. A nonlinear optical medium in accordance with claim 14 wherein the optical medium is characterized by an external field-induced orientation of aligned polymer molecules.

16. A nonlinear optical medium comprising a composite composition of a homogeneous inorganic glass monolith with a microporous structure containing a thermoplastic polymer which is characterized by a recurring monomeric unit corresponding to the formula:

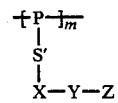

where P is a polymer main chain unit; m is an integer of at least 3; S' is a flexible spacer group having a linear chain length of between about 1–25 atoms; X is —NR—, —O— or —S—; R is hydrogen or a $C_1$-$C_4$ alkyl group; Y is

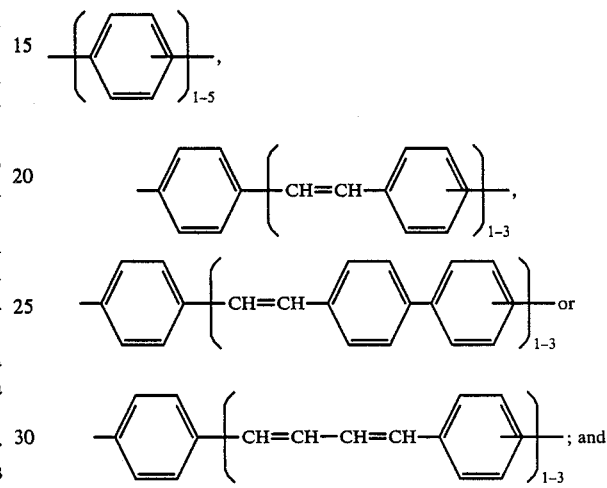

Z is an electron-donating group or an electron-withdrawing group; wherein the glass monolith microporous structure has pore diameters in the range between about 50–300 angstroms, and substantially all of the pores in the microporous structure have diameters within about a 100 angstrom diameter variation range.

17. A nonlinear optical medium in accordance with claim 16 wherein the main chain is a polyvinyl structure.

18. A nonlinear optical medium comprising a composite composition of a homogeneous inorganic glass monolith with a microporous structure containing a thermoplastic polymer which is characterized by a recurring monomeric unit corresponding to the formula:

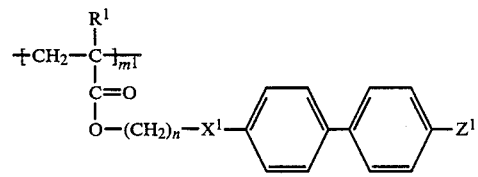

where $m^1$ is an integer of at least 5; n is an integer between about 4–20; $X^1$ is —$NR^1$, —O— or —S—; $R^1$ is hydrogen or methyl; and $Z^1$ is —$NO_2$, —CN or —$CF_3$; wherein the glass monolith microporous structure has pore diameters in the range between about 50–300 angstroms, and substantially all of the pores in the microporous structure have diameters within about a 100 angstrom diameter variation range.

* * * * *